(12) United States Patent
Nakai

(10) Patent No.: US 9,857,598 B2
(45) Date of Patent: *Jan. 2, 2018

(54) DISPLAY CONTROL DEVICE, DISPLAY CONTROL METHOD, NON-TRANSITORY RECORDING MEDIUM, AND PROJECTION DEVICE

(71) Applicant: Panasonic Intellectual Property Management Co., Ltd., Osaka (JP)

(72) Inventor: Wataru Nakai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 119 days.

This patent is subject to a terminal disclaimer.

(21) Appl. No.: 14/878,194

(22) Filed: Oct. 8, 2015

(65) Prior Publication Data
US 2016/0116749 A1    Apr. 28, 2016

(30) Foreign Application Priority Data

Oct. 24, 2014   (JP) ................. 2014-217138

(51) Int. Cl.
*G02B 27/01*    (2006.01)
*G06K 9/00*    (2006.01)
(Continued)

(52) U.S. Cl.
CPC ............ *G02B 27/0179* (2013.01); *B60R 1/00* (2013.01); *G02B 27/01* (2013.01);
(Continued)

(58) Field of Classification Search
CPC  G02B 27/0179; G02B 27/01; G02B 27/0101; G06K 9/00671; G06K 9/00791; G06K 9/00845; G09G 3/002
See application file for complete search history.

(56) References Cited

U.S. PATENT DOCUMENTS

2006/0018027 A1* 1/2006 Yamasaki ............ G02B 27/017
                                                            359/631
2010/0128121 A1* 5/2010 Wilkinson ............. H04N 5/272
                                                            348/135
(Continued)

FOREIGN PATENT DOCUMENTS

JP    2010-039793    2/2010

OTHER PUBLICATIONS

The Extended European Search Report dated Jan. 28, 2016 for the related European Patent Application No. 15188364.2.

*Primary Examiner* — Ricardo L Osorio
(74) *Attorney, Agent, or Firm* — Greenblum & Bernstein, P.L.C.

(57) ABSTRACT

A display control device includes: an acquirer that receives inclination information on an occupant's head in a mobile body from a detector; and a controller that controls a displayer to generate a predetermined image representing a presentation image superimposed on an object as viewed from the occupant, based on recognition results of the object and the inclination information. When the object is recognized, with the head not inclined, the controller causes the displayer to generate a first predetermined image representing a first presentation image including one or more first lines in which a line segment connecting both ends is horizontal, or with the head inclined, the controller causes the displayer to generate a second predetermined image representing a second presentation image including a second line which is obtained by inclining at least one of the first lines by an angle according to the inclination of the occupant's head.

8 Claims, 9 Drawing Sheets

(51) Int. Cl.
*G09G 3/00* (2006.01)
*B60R 1/00* (2006.01)

(52) U.S. Cl.
CPC ..... *G02B 27/0101* (2013.01); *G06K 9/00671* (2013.01); *G06K 9/00791* (2013.01); *G06K 9/00845* (2013.01); *G09G 3/002* (2013.01); *B60R 2300/205* (2013.01); *B60R 2300/308* (2013.01); *G02B 2027/012* (2013.01); *G02B 2027/014* (2013.01); *G02B 2027/0118* (2013.01); *G02B 2027/0138* (2013.01); *G02B 2027/0187* (2013.01); *G09G 2320/0261* (2013.01); *G09G 2380/10* (2013.01)

(56) References Cited

U.S. PATENT DOCUMENTS

| | | | | |
|---|---|---|---|---|
| 2013/0342913 | A1* | 12/2013 | Tsimhoni | G02B 27/01 359/630 |
| 2015/0009236 | A1* | 1/2015 | Saito | G02B 27/017 345/656 |
| 2016/0018887 | A1* | 1/2016 | Tsukahara | G06F 1/1694 345/8 |
| 2016/0117802 | A1* | 4/2016 | Nakai | G06F 3/012 345/633 |

\* cited by examiner

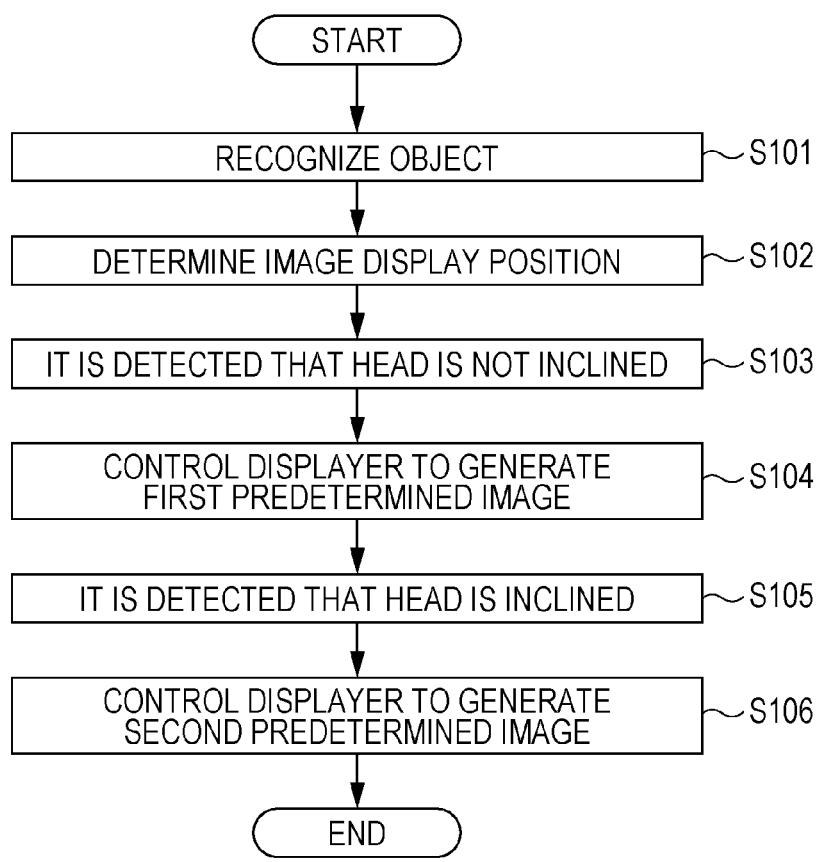

DISPLAY CONTROL DEVICE, DISPLAY CONTROL METHOD, NON-TRANSITORY RECORDING MEDIUM, AND PROJECTION DEVICE

BACKGROUND

1. Technical Field

The present disclosure relates to a display control device that controls display of information provided to an occupant of a vehicle or the like, a display control method, a non-transitory recording medium, and a projection device.

2. Description of the Related Art

In recent years, development of head-up display (HUD) device has been promoted. The head-up display device allows a driver to visually recognize an image by projecting the image on the windshield of a vehicle. With this device, an image is superimposed on an object (for instance, other vehicles, a pedestrian, a building) of the real world, thereby improving visibility of the object.

With such a head up display device, what is called a double image problem occurs in the field of view of the driver. Because the right and left eyes of a human are separated by approximately 6 to 6.5 cm, when the driver gazes at an object, images formed on the retinas of the right and left eyes have disparity, that is, binocular disparity occurs. Therefore, although an object gazed by a human is visually recognized as a single image, another object far from or near to the object gazed is visually recognized as two images, that is, double images. As a method for solving the double image problem, for instance, the method disclosed in Japanese patent No. 4970379 is known (hereinafter referred to as a related art).

In the related art, for the purpose of inhibiting the effect of double images, images are generated and displayed at the position of an object detected by a camera or the like, superimposed on the object, the images providing no feeling of strangeness even when being visually recognized as double images. Specifically, images of dots pattern or I mark shape are generated and displayed in association with the object, thereby making it possible for the driver to recognize the presence and the position of the object even when double images occur.

SUMMARY

In the above-mentioned related art, the driver is assumed to face the front with the head upright and move of the head is not taken into consideration while the driver driving. Therefore, it was not easy for the driver to recognize a correspondence relationship between a real object and a projected image, when a head of a driver inclines a front back direction and/or a right left direction.

One non-limiting and exemplary embodiment provides a display control device in which move of the head of an occupant is taken into consideration, a display control method, a non-transitory recording medium, and a projection device.

In one general aspect, the techniques disclosed here feature a display control device including: an acquirer that receives information on an inclination of a head of an occupant in a mobile body from a detector that detects the inclination; and a controller that controls a displayer to generate a predetermined image based on a result of recognition of an object in front of the mobile body from a recognizer and the inclination information, the predetermined image representing a presentation image to be superimposed on the object as viewed from the occupant when the presentation image is displayed on a display medium. The controller has a configuration in which in the case where the object is recognized, when the head is not inclined, the controller outputs a control information to the displayer to generate a first predetermined image that represents a first presentation image that includes one or more first lines in which a line segment connecting both ends is horizontal, and when the head is inclined, the controller outputs a control information to the displayer to generate a second predetermined image that represents a second presentation image that includes a second line which is obtained by inclining only at least one of the one or more first lines by an angle which is determined according to the inclination of the head of the occupant.

According to the present disclosure, even when the head of an occupant moves, it is possible for the occupant to easily recognize the correspondence relationship between the object and the image.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a flow chart briefly illustrating an operation example of a display system according to the embodiment of the present disclosure;

DETAILED DESCRIPTION (Underlying Knowledge Forming Basis of the Present Disclosure)

In the related art described above, when a driver inclines his/her head, vertically shifted double images are seen by the driver. In this situation, correspondence between an object and images seen as double images becomes less clear, and thus it is difficult for the driver to recognize the correspondence relationship between the object and the images. An aspect of the present disclosure provides a display control device, a display control method, a recording medium and a projection device that allow an occupant to easily recognize the correspondence relationship between the object and the image even when the occupant inclines his/her head.

Hereinafter, an embodiment of the present disclosure will be described with reference to the drawings.

Figure 1:
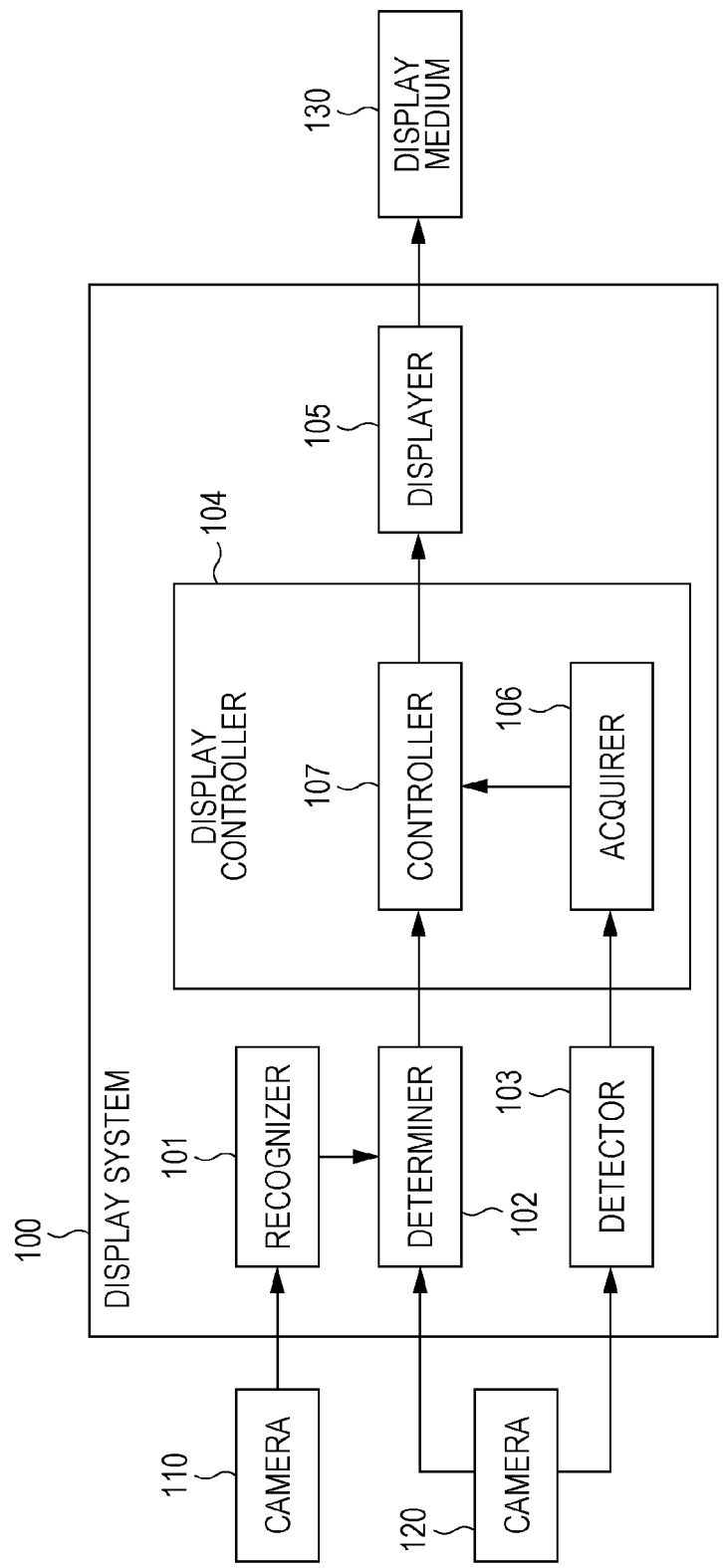
FIG. 1 a block diagram illustrating a configuration example of a display system according to an embodiment of the present disclosure.

First, a configuration example of a display system 100 according to the present embodiment will be described with reference to FIG. 1. FIG. 1 a block diagram illustrating a configuration example of the display system 100 according to the embodiment.

The display system 100 is a system which is used in a movable body such as a vehicle and which supports the operation of the vehicle. The display system 100 may be an in-vehicle equipment or may be a device which is carried in a vehicle. Although a case will be described in which the display system 100 is applied to a vehicle, the mobile body is not limited to a vehicle and may be a boat, an airplane, or the like. Although an example will be described in which a user is an occupant of a vehicle, particularly a user is the driver of a vehicle in the present embodiment, the present disclosure is not limited to this. In addition, the display system 100 may be used in a wearable computer (for instance, HMD described later) which may be worn on the body of a user.

As illustrated in FIG. 1, a camera 110, a camera 120, and a display medium 130 are connected to the display system 100.

The camera 110 is mounted on the inside or the outside of a vehicle, and captures the front field of view (hereinafter referred to as a front vision) of the driver. An image (hereinafter referred to as a front vision image) captured by the camera 110 is outputted to the later-described recognizer 101. It is to be noted that although the camera 110 is used as a sensor for the front vision in the present embodiment, without being limited to this, a radar may be used, for instance.

The camera 120 is called an inner camera or a driver monitoring camera and is mounted on the inside of a vehicle to capture the face of the driver. An image (hereinafter referred to as a face image) captured by the camera 120 is outputted to the later-described determiner 102 and detector 103.

The display medium 130 is a medium which is used in a vehicle and on which an image (details will be described later) generated by the later-described displayer 105 is displayed. In the present embodiment, the display medium 130 is a transparent display medium through which light is transmitted.

As the display medium 130, for instance, a head up display (HUD), a liquid crystal display (LCD), a head-mounted display or a helmet-mounted display (HMD), a glasses type display (smart glasses), or other dedicated display may be used. The HUD may be, for instance, a windshield of a vehicle, or may be a glass surface, a plastic surface (for instance, a combiner) that is provided separately. Also, the windshield may be, for instance, the glass on the front side of a vehicle or may be the side glass or the rear glass of a vehicle. In either case, an image is displayed on the display medium 130.

Furthermore, the HUD may be a translucent display that is provided on the surface of or in the windshield. Here, the translucent display is, for instance, a translucent organic electroluminescence display or a transparent display using a glass that reflects light when the glass is irradiated with light with a specific wavelength. The driver is able to visually recognize the background as well as the display on the translucent display at the same time. Thus, the display medium 130 is a display medium that allows light to transmit therethrough. In either case, an image is displayed on the display medium 130.

It is to be noted that although the example of FIG. 1 adopts a configuration in which the display system 100 does not include the display medium 130, the display system 100 may include the display medium 130.

In FIG. 1, the display system 100 has the recognizer 101, the determiner 102, the detector 103, a display control device 104, and the displayer 105. The display control device 104 has an acquirer 106 and a controller 107. Hereinafter, each component will be described.

The recognizer 101 extracts characteristic quantities included in the front vision image obtained from the camera 110 and recognizes objects based on the extracted characteristic quantities. The object includes, for instance, a white line on a road, a sign, a pavement marking, a curbstone, a guardrail, a traffic signal, a utility pole, a vehicle, a human, and a building.

The recognizer 101, when recognizing an object, calculates the position of the object in real space. The recognizer 101 then outputs information (hereinafter referred to as object position information) that indicates the position of the object in real space to the determiner 102. It is to be noted that recognition processing of an object and calculation processing of the position of the object in real space are known arts, and thus detailed description is omitted.

Figure 2:
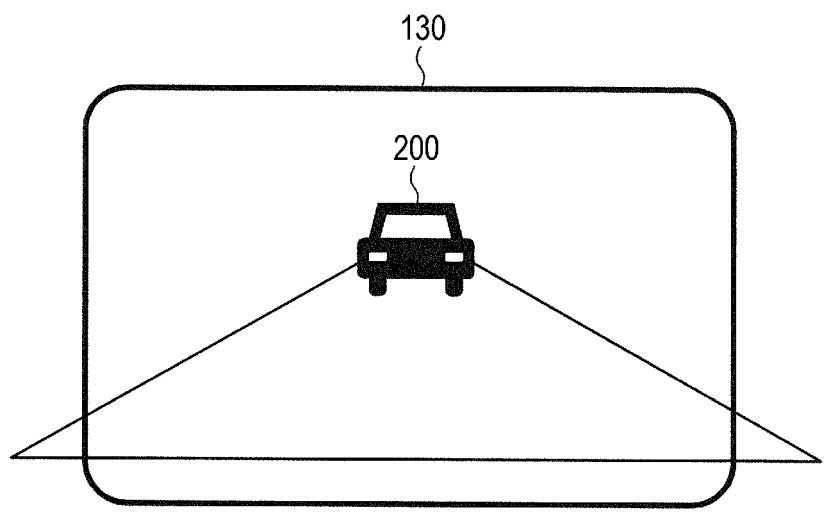
FIG. 2 is an illustration depicting an example of a front vision according to the embodiment of the present disclosure.

Here, an example of a front vision of a driver is illustrated in FIG. 2. For instance, as illustrated in FIG. 2, when a preceding vehicle 200 is ahead of a vehicle, the driver is able to visually recognize the preceding vehicle 200 via the display medium 130. In this case, the recognizer 101 recognizes the preceding vehicle 200 and calculates the position of the preceding vehicle 200 in real space. The recognizer 101 then outputs object position information to the determiner 102, the object position information indicating the position of the preceding vehicle 200 in real space.

The determiner 102 detects an area (hereinafter referred to as an eye area) of the eyes of the driver based on the face image obtained from the camera 120. The eye area is a predetermined area including both eyes, for instance. It is to be noted that processing of detecting the eye area by performing image processing on the face image is known art, and thus detailed description is omitted. In the present embodiment, the determiner 102 detects the eye area based on the face image, and the eye area may be, for instance, a predetermined area or an area which is detected based on the line of sight of the driver, detected by a line of sight detector (not illustrated) that detects the driver's line of sight.

The determiner 102 then determines the position (hereinafter referred to as an image display position) on the display medium 130 where an image generated by the displayer 105 is displayed, based on the relationship between a predetermined point (for instance, either the right eye or the left eye, or the center between the right eye and the left eye) in the detected eye area in real space, the position of the object in real space indicated by the object position information obtained from the recognizer 101, and the position of the display medium 130 in real space. In other words, the image display position is the position of an object on the display medium 130 when the object is observed from a predetermined point in the eye area via the display medium 130. It is to be noted that processing of determining the image display position is known art, and thus detailed description is omitted.

The determiner 102 then outputs information (hereinafter referred to as image display position information) to the controller 107 of the display control device 104, the information indicating an image display position.

The detector 103 detects an inclination (angle) of the head of a driver based on the face image obtained from the camera 120. The inclination of the head is the rotational inclination around an axis in a front back direction of the head. In other words, the inclination of the head is the inclination of the head of a driver who faces the front and inclines his/her head to the right or left side. It is to be noted that processing of detecting the inclination of the head is known art, and thus detailed description is omitted.

The detector 103 then outputs information (hereinafter referred to as inclination information) to the acquirer 106 of the display control device 104, the information indicating the inclination of the head.

The acquirer 106 obtains inclination information from the detector 103 and outputs the inclination information to the controller 107.

The controller 107 controls the displayer 105 to generate and display a predetermined image based on the inclination information and the image display position information. For instance, the controller 107 generates control information that indicates control details regarding generation and display of the predetermined image, and outputs the control information to the displayer 105, thereby controlling the displayer 105. It is to be noted that the details of the control by the controller 107 will be described later.

The predetermined image mentioned above is an image which is generated by the displayer 105 and which indicates a presentation image (for instance, the later-described image 300, image 400) to be presented to an occupant of a vehicle when displayed on the display medium 130. That is, the image to be presented and the predetermined image have substantially the same details.

The displayer 105 generates a predetermined image based on the control information obtained from the controller 107 and displays the predetermined image on the display medium 130. For instance, when the display medium 130 is a HUD, the displayer 105 projects (casts) the predetermined image on the display medium 130 using a projector function. Thus, a predetermined image is visually recognized by the driver as a virtual image. It is to be noted that the principle of visual recognition as a virtual image by the driver of an image projected on the display medium is known art, and thus detailed description is omitted.

In the present embodiment, description will be given below based on the understanding that projecting a predetermined image on the display medium 130 to allow an occupant to virtually recognize the image as a virtual image and displaying a predetermined image on the display medium 130 mean exactly the same thing. That is, in the following description, projecting a predetermined image to the HUD to allow an occupant to virtually recognize the image as a virtual image is referred to as display.

It is to be noted that instead of using a projector function, the displayer 105 may use, for instance, the principle of hologram to display an image on the HUD. When the hologram is used, a system may be adopted in which a light guide plate is used to guide light by totally internally reflecting parallel light flux group that satisfies internal total reflection conditions for a light guide plate. In contrast to the projector, an image is not directly projected in the system using a light guide plate. However, for the purpose of illustration, description is given in terms of projection and display similarly to the projector system.

Although the displayer 105 generates a predetermined image in the present embodiment, the predetermined image may be generated by the display control device 104 or another component which is not illustrated.

Alternatively, the displayer 105 may be included in the display control device 104 to serve as a projection device.

Next, a specific example of control processing by the controller 107 will be described in the following. Here, first, as a comparative example of the present embodiment, the control processing, in which an image is generated without consideration of the inclination of the head, will be described with reference to FIGS. 3 and 4, and subsequently, the control processing in the present embodiment will be described with reference to FIG. 5.

Figure 3:
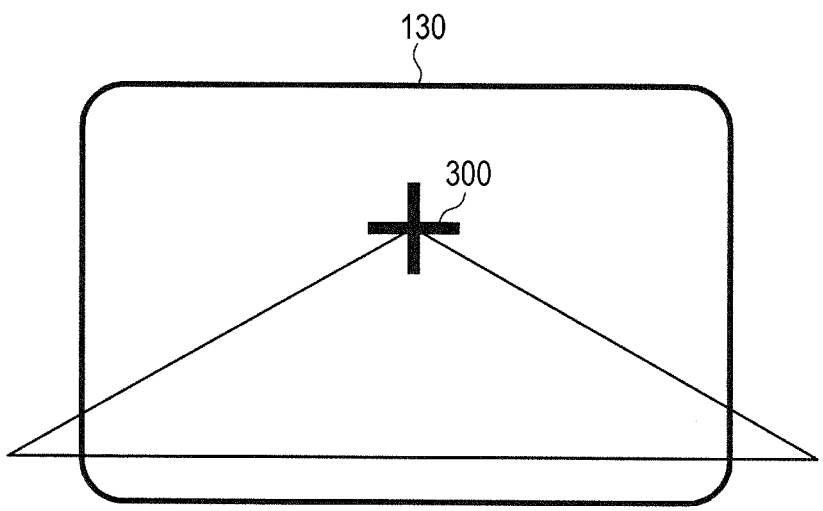
FIG. 3 is an illustration depicting an example of display on a display medium of an image according to the embodiment of the present disclosure.

First, the control processing in a comparative example will be described. FIG. 3 illustrates an example in which the displayer 105 generates an image based on control information from the control unit 107, and displays the image on the display medium 130. In this case, the controller 107 controls the displayer 105 to generate a predetermined image 300 and to display the image 300 at the position of the preceding vehicle 200 on the display medium 130. The image 300 is an image that includes a line segment in a horizontal direction (hereinafter referred to as a horizontal line segment) and a line segment vertical to the horizontal line segment (hereinafter referred to as a vertical line segment). The horizontal line segment is a line in which a line segment connecting both ends is horizontal.

Figure 4A:
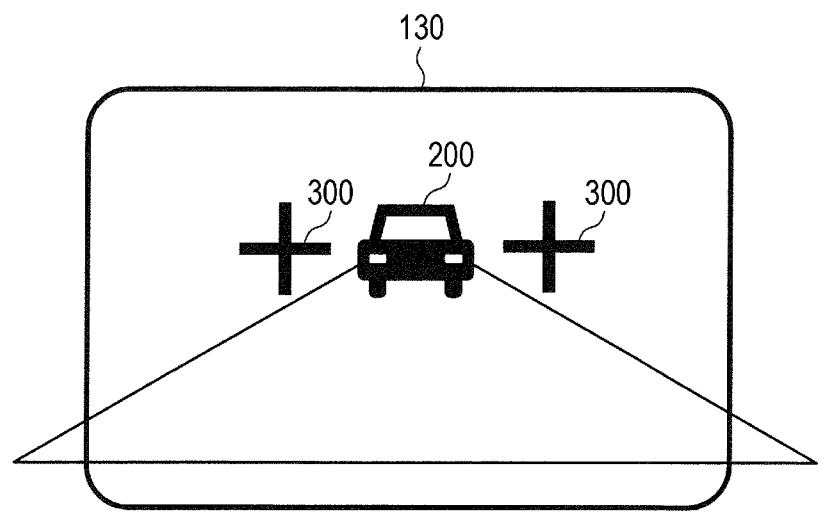
FIG. 4A is an illustration depicting an example in which the image illustrated in FIG. 3 is seen as a double image with the head of an occupant not inclined.

FIG. 4A illustrates an example of how the image 300 illustrated in FIG. 3 is seen when the head of the driver is not inclined. When the driver sees the preceding vehicle 200 via the display medium 130 with his/her head not inclined, the image 300 is seen on each of the right and left sides of the preceding vehicle 200 as illustrated in FIG. 4A. That is, the driver sees the image 300 as a double image. At this point, the extension lines of the horizontal line segments of two images 300 may be recognized as connected, and thus it is easy to understand that an object is indicated by the preceding vehicle 200 interposed between two images 300 that are seen as double images.

Figure 4B:
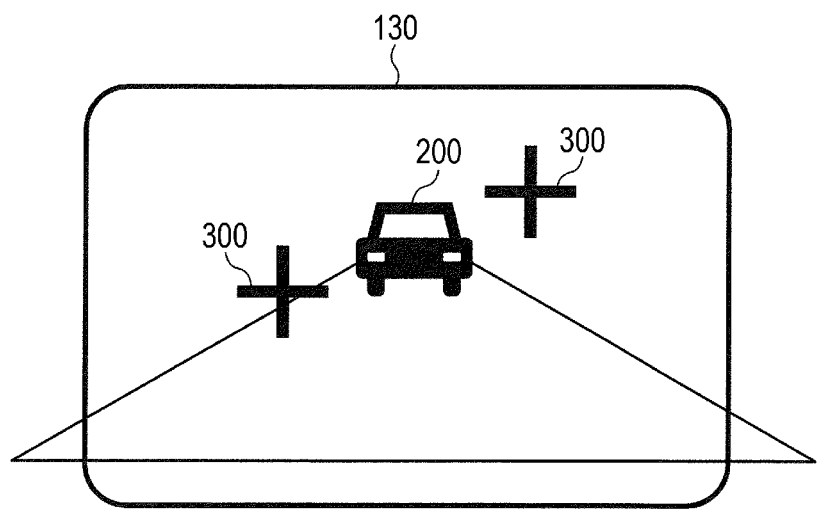
FIG. 4B is an illustration depicting an example in which the image illustrated in FIG. 3 is seen as a double image with the head of an occupant inclined.

FIG. 4B illustrates an example of how the image 300 illustrated in FIG. 3 is seen when the head of the driver is inclined. When the driver sees the preceding vehicle 200 via the display medium 130 with his/her head inclined, the image 300 on each of the right and left sides of the preceding vehicle 200 appears to be vertically shifted as illustrated in FIG. 4B. At this point, the extension lines of the horizontal line segments of two images 300 may not be recognized as connected, and thus it is not easy to understand that an object is indicated by the preceding vehicle 200 interposed between two images 300 that are seen as double images.

Thus, in the present embodiment, the controller 107 performs the following control processing, thereby allowing the driver to easily recognize the correspondence relationship between the object and the images seen as double images. Next, the control processing in the present embodiment will be described.

First, the control processing to be performed when the head of driver is not inclined will be described. In this case, the controller 107 performs the control processing similar to that in the comparative example described above. That is, when the inclination information obtained from the detector 103 indicates that the head is not inclined (angle θ1 indicated by the inclination information is 0°) the controller 107 controls the displayer 105 to generate the predetermined image 300 and to display the image 300 at an image display position (for instance, the position of the preceding vehicle 200 on the display medium 130) on the display medium 130. Consequently, the displayer 105 generates the image 300 and displays the image 300 at the image display position on the display medium 130.

At this point, when the driver sees the preceding vehicle 200 via the display medium 130, the image 300 is seen on each of the right and left sides of the preceding vehicle 200 as double images as illustrated in FIG. 4A. As described above, the preceding vehicle 200 is seen on the extension line of the horizontal line segment of each of the two images 300, and thus the driver easily recognizes the correspondence relationship between the preceding vehicle 200 and the images 300 seen as double images.

Figure 5A:
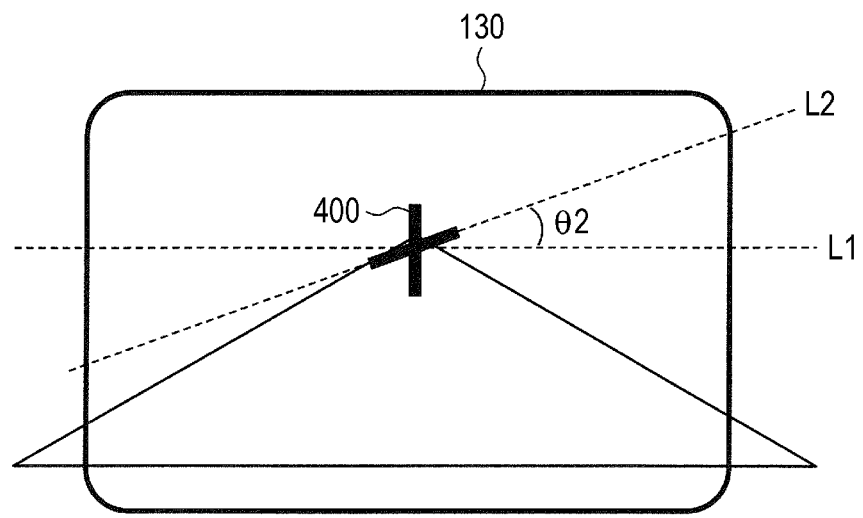
FIG. 5A is an illustration depicting an example of display on a display medium of the image according to the embodiment of the present disclosure.

Next, the control processing to be performed when the head of driver is inclined will be described with reference to FIG. 5A. In FIG. 5A, virtual line L1 indicates a horizontal line and virtual line L2 indicates the line obtained by inclining the line L1 by θ2. The virtual lines L1, L2 are illustrated for the purpose of explanation and are not displayed on the display medium 130.

When the inclination information obtained from the acquirer 106 indicates that the head is inclined (for instance, by a predetermined angle other than 0°), the controller 107 determines an image 400 to be generated by the displayer 105, the image 400 being obtained by inclining the horizontal line segment of the predetermined image 300 by a certain angle θ2 (θ2≠0°) according to the angle θ1 (θ1≠0°) indicated by the inclination information. It is to be noted that the angle θ1 and the angle θ2 may have the same value or may have different values.

The controller 107 then controls the displayer 105 to generate the determined image 400 and to display the image 400 at an image display position on the display medium 130. Consequently, the displayer 105 generates the image 400 and displays the image 400 at the image display position on the display medium 130. The example in this case is illustrated in FIG. 5B.

Figure 5B:
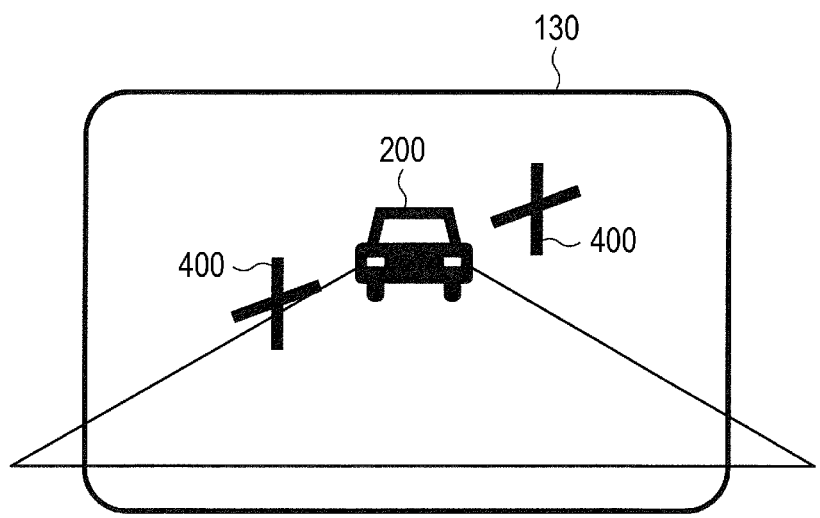
FIG. 5B is an illustration depicting an example in which the image illustrated in FIG. 5A is seen as a double image with the head of an occupant inclined.

FIG. 5B illustrates an example of how the image 400 illustrated in FIG. 5A is seen. When the driver sees the preceding vehicle 200 via the display medium 130, the image 400 is seen on each of the right and left sides of the preceding vehicle 200 as double images as illustrated in FIG. 5B. Although the image 400 on each of the right and left sides of the preceding vehicle 200 appears to be vertically shifted at this point, the driver easily recognizes the correspondence relationship between the preceding vehicle 200 and the images 400 seen as double images because the preceding vehicle 200 is seen on the extension line of the inclined line segment (the line segment obtained by inclining the horizontal line segment of the image 300) of each of two images 400.

So far, the configuration example of the display system 100 according to the present embodiment has been described.

Next, an operation example of the display system 100 according to the present embodiment will be briefly described with reference to FIG. 6. FIG. 6 is a flow chart briefly illustrating an operation example of the display system 100 according to the present embodiment.

First, the recognizer 101 recognizes a predetermined object in the front vision image (step S101).

Next, the determiner 102 determines an image display position on the display medium 130 (step S102).

Here, it is assumed that the detector 103 detects that the head of the driver is not inclined, for instance (step S103).

In this case, the controller 107 controls the display unit 105 to generate a first predetermined image (step S104). In addition, the controller 107 controls the display unit 105 to display the first predetermined image at the image display position. The control of processing causes the displayer 105 to generate the first predetermined image and to display the first predetermined image at the image display position of the display medium 130. The details of the first predetermined image will be described later.

Subsequently the detector 103 detects that the head of the driver is inclined, for instance (step S105).

In this case, the controller 107 controls the displayer 105 to generate a second predetermined image (step S106). In addition, the controller 107 controls the display unit 105 to display the second predetermined image at the image display position. The control of processing causes the displayer 105 to generate the second predetermined image and to display the second predetermined image at the image display position of the display medium 130. The details of the second predetermined image will be described later.

Figure 7:
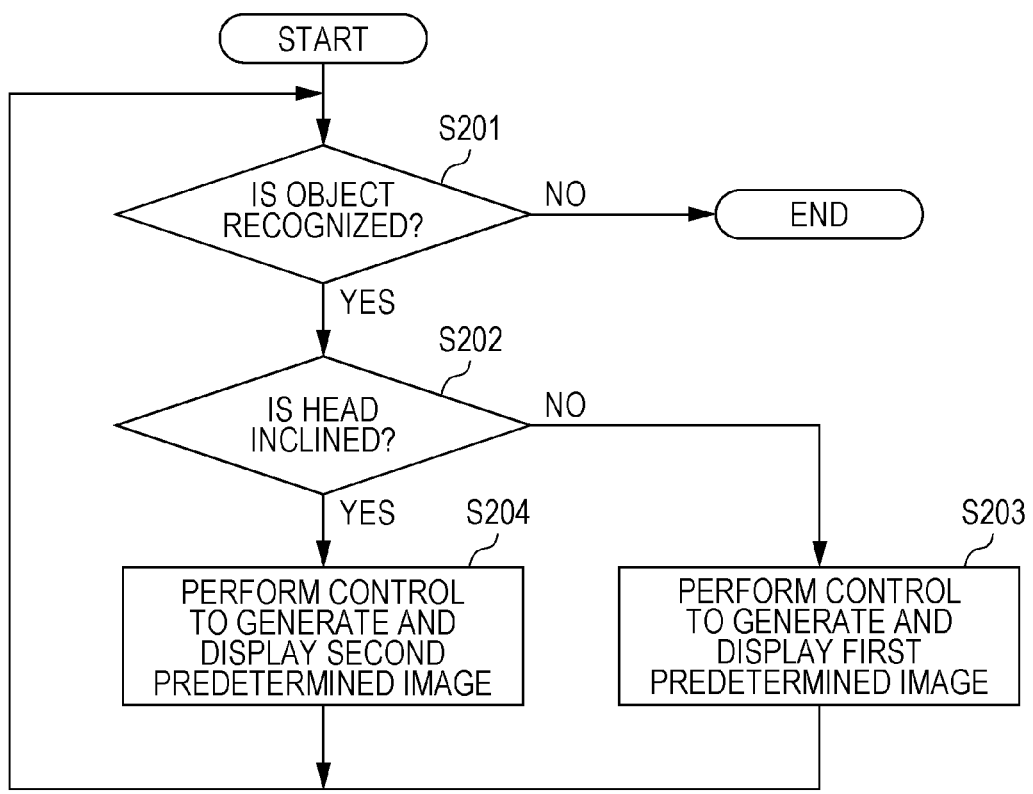
FIG. 7 is a flow chart illustrating an operation example of the display system according to the embodiment of the present disclosure.

So far, the operation example of the display system 100 according to the present embodiment has been briefly described, and hereinafter, the operation example of the display system 100 will be described in detail with reference to FIG. 7.

First, the recognizer 101 extracts characteristic quantities included in the front vision image obtained from the camera 110, and recognizes predetermined objects based on the extracted characteristic quantities (step S201).

When the recognizer 101 recognize no predetermined object (NO in step S201), the entire processing is completed. On the other hand, when the recognizer 101 recognizes a predetermined object (YES in step S201), the recognizer 101 calculates the position of the object. Here, as an example, it is assumed that a preceding vehicle is recognized by the recognizer 101 and the position is calculated.

When a preceding vehicle is recognized by the recognizer 101, the determiner 102 determines an image display position based on the relationship between the position of a predetermined point in the eye area of the driver, the position of the preceding vehicle, calculated by the recognizer 101, and the position of the display medium 130. The image display position herein is the position of a preceding vehicle on the display medium 130 when the preceding vehicle is observed from the predetermined point in the eye area of the driver via the display medium 130.

Subsequently, the detector 103 detects whether or not the head of the driver is inclined based on the face image obtained from the camera 120 (step S202).

When the detector 103 detects that the head of the driver is not inclined (NO in step S202), the controller 107 obtains inclination information, which indicates that the head is not inclined, from the detector 103 via the acquirer 106 and controls the displayer 105 to generate the first predetermined image based on the inclination information (step S203). In addition, the controller 107 controls the display unit 105 to display the first predetermined image at the image display position indicated by the image display position information obtained from the determiner 102.

The first predetermined image is an image which is generated by the displayer 105 and which indicates a first presentation image when displayed on the display medium 130. The first presentation image is, for instance, the image 300 that is illustrated in FIG. 3 and includes one horizontal line segment. It is to be noted that the first presentation image is not limited to the image 300 and may be an image that includes one or more lines in which a line segment connecting both ends is horizontal. A specific example will be explained in the later-described modifications.

The above-described control processing in step S203 causes the displayer 105 to generate the first predetermined image and to display the first predetermined image at the image display position of the display medium 130. This allows the driver to visually recognize each image 300 as illustrated in FIG. 4A, for instance.

After the aforementioned generation and display of the first predetermined image, it is assumed for instance that the aforementioned preceding vehicle is continued to be recognized by the recognizer 101 (YES in step S201). Also it is assumed that an inclination of the head of the driver is detected by the detector 103 (YES in step S202).

In this case, the controller 107 obtains inclination information, which indicates that the head is inclined, from the detector 103 via the acquirer 106 and controls the displayer 105 to generate the second predetermined image based on the inclination information (step S204). In addition, the controller 107 controls the display unit 105 to display the second predetermined image at the image display position indicated by the image display position information obtained from the determiner 102.

The second predetermined image is an image which is generated by the displayer 105 and which indicates a second presentation image when displayed on the display medium 130. The second presentation image is, for instance, the image 400 that is illustrated in FIG. 5A and includes a line segment which is obtained by inclining one horizontal line segment of the image 300. The second presentation image is not limited to the image 400 and may be an image which is obtained by inclining only at least one of one or more lines in the first presentation image by an angle which is determined according to the angle indicated by the inclination information. A specific example will be explained in the later-described modifications.

The above-described control processing in step S204 causes the displayer 105 to generate the second predetermined image and to display the second predetermined image at the image display position of the display medium 130. This allows the driver to visually recognize each image 400 as illustrated in FIG. 5B, for instance.

Subsequently, the above-described steps S201 to S204 are performed while the aforementioned preceding vehicle is continued to be recognized by the recognizer 101. When the aforementioned preceding vehicle is not recognized by the recognizer 101 (NO in step S201), the entire processing is completed.

So far, the operation example of the display system 100 according to the present embodiment has been described in detail with reference to FIG. 7.

In this manner, in the present embodiment, when the driver gazes at an object via the display medium with his/her head inclined, the object appears to be located on the extension lines of the lines included in the images seen as double images. Therefore, in the present embodiment, even when the driver inclines his/her head, the driver easily recognizes the correspondence relationship between the object and the images seen as double images.

Although the embodiment of the present disclosure has been described so far, the present disclosure is not limited to the embodiment described above and various modifications are possible. Hereinafter, a modification will be described.

(First Modification)

In the embodiment described above, for instance, the controller 107 may control the displayer 105 to make the brightness of the horizontal line segment of the image 300 higher than the brightness of the vertical line segment of the image 300 when the image 300 is generated. Similarly, the controller 107 may control the displayer 105 to make the brightness of the inclined line segment (the line segment obtained by inclining the horizontal line segment of the image 300) of the image 400 higher than the brightness of the vertical line segment of the image 400 when the image 400 is generated.

Thus, according to the present modification, the horizontal line segment and the line segment obtained by inclining the horizontal line segment appear to be highlighted, thereby allowing the driver to further easily recognize the correspondence relationship between the object and the images seen as double images.

(Second Modification)

Although the case has been described where the images 300 and 400 are formed of line segments in the embodiment above, the image may include a curved portion.

Figure 8A:
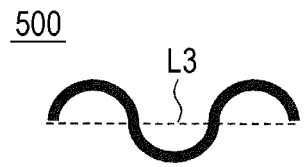
FIG. 8A is an illustration depicting an example of an image according to a second modification of the embodiment of the present disclosure.

As illustrated in FIG. 8A, an image 500 includes only a curve. In the image 500, line segment L3 that connects both ends of the curve is horizontal. It is to be noted that the line segment L3 is illustrated for the purpose of explanation and is not displayed on the display medium 130.

Figure 8B:
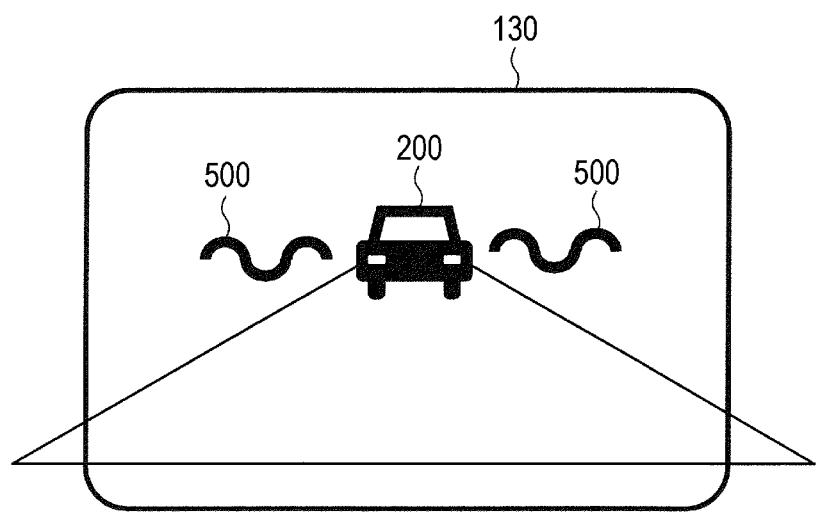
FIG. 8B is an illustration depicting an example in which the image illustrated in FIG. 8A is seen as a double image with the head of an occupant not inclined.

FIG. 8B illustrates an example of how images 500 are each displayed at an image display position on the display medium 130 when the head of the driver is not inclined. As illustrated in FIG. 8B, the images 500 are seen as double images on both the right and left sides of the preceding vehicle 200 as the object. At this point, the driver sees the preceding vehicle 200 on the extension line of the line segment L3 that connects the end points of each image 500.

Figure 8C:
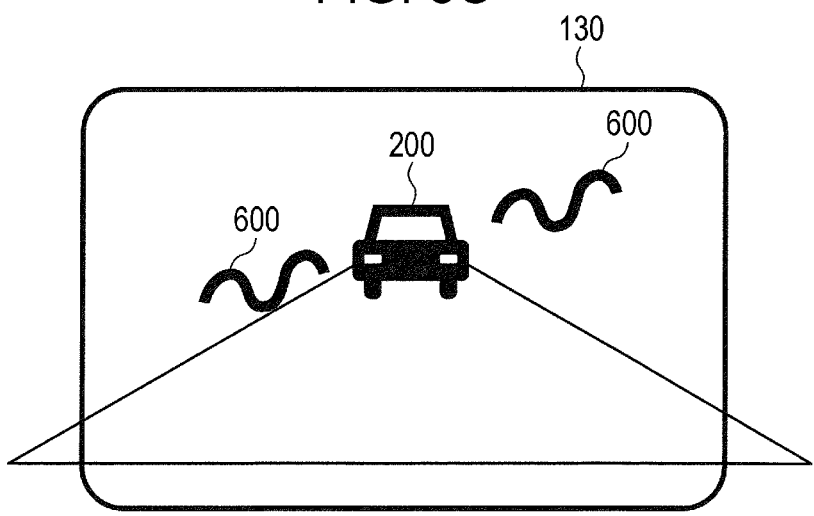
FIG. 8C is an illustration depicting an example in which the image illustrated in FIG. 8A is seen as a double image with the head of an occupant inclined.

When the driver inclines his/her head while seeing the images 500 as illustrated in FIG. 8B, images are each generated and displayed at an image display position on the display medium 130, the images being obtained by inclining the images 500 by an angle which is determined according to the inclination of the head. FIG. 8C illustrates an example of how the images are seen at this point. As illustrated in FIG. 8C, images 600 on both the right and left sides of the preceding vehicle 200 as the object are vertically shifted and seen as double images. At this point, similarly to the case of FIG. 8B, the driver see the preceding vehicle 200 on the extension line of the line segment L3 that connects the end points of each image 600.

(Third Modification)

In the embodiment described above, the image 300 including only one horizontal line segment has been described. However, the present disclosure is not limited to this. For instance, as illustrated in FIG. 9A, an image 700 including a plurality of horizontal line segments may be used.

Figure 9A:
FIG. 9A is an illustration depicting an example of an image according to a third modification of the embodiment of the present disclosure.

As illustrated in FIG. 9A, the image 700 includes two parallel horizontal line segments.

Figure 9B:
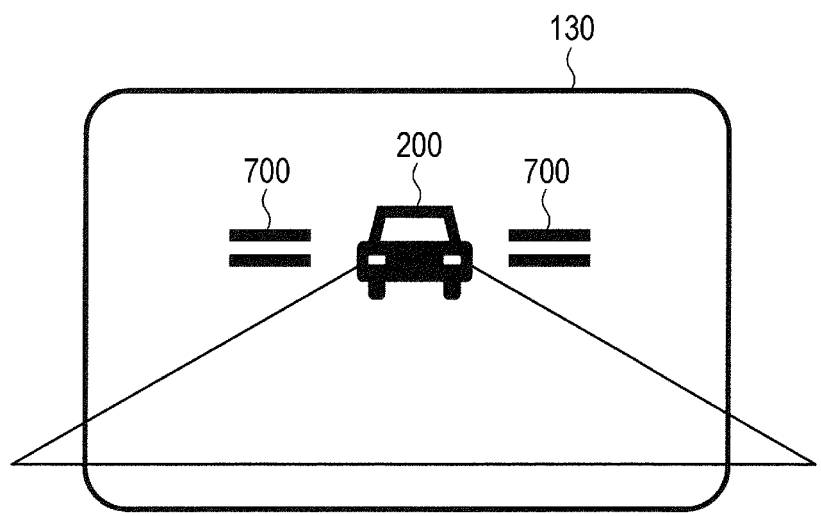
FIG. 9B is an illustration depicting an example in which the image illustrated in FIG. 9A is seen as a double image with the head of an occupant not inclined.

FIG. 9B illustrates an example of how the images 700 are each displayed at an image display position on the display medium 130 when the head of the driver is not inclined. As illustrated in FIG. 9B, the images 700 are seen as double images on both the right and left sides of the preceding vehicle 200 as the object. At this point, the driver see the preceding vehicle 200 on the extension line of each horizontal line segment of each image 700.

Figure 9C:
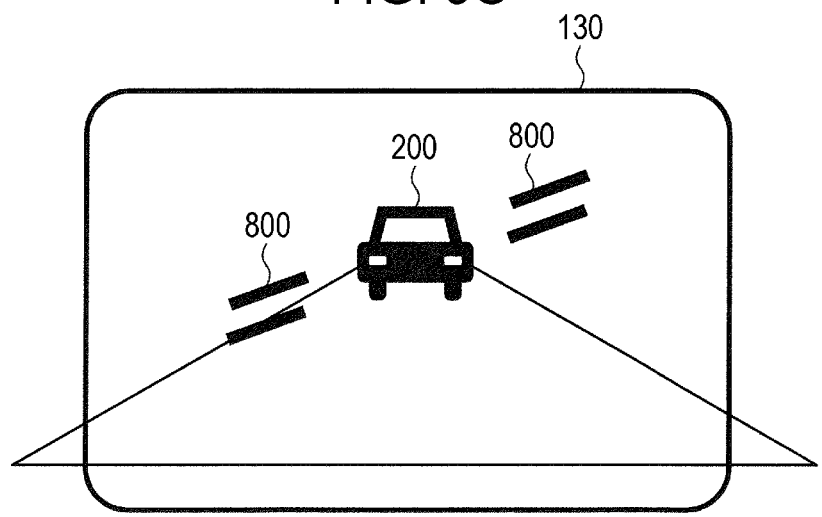
FIG. 9C is an illustration depicting an example in which the image illustrated in FIG. 9A is seen as a double image with the head of an occupant inclined.

When the driver inclines his/her head while seeing the images 700 as illustrated in FIG. 9B, images are each generated and displayed at an image display position on the display medium 130, the images being obtained by inclining the images 700 by an angle which is determined according to the inclination of the head. FIG. 9C illustrates an example of how the images are seen at this point. As illustrated in FIG. 9C, images 800 on both the right and left sides of the preceding vehicle 200 as the object are vertically shifted and seen as double images. At this point, similarly to the case of FIG. 9B, the driver see the preceding vehicle 200 on the extension line of each horizontal line segment of each image 800.

(Fourth Modification)

In the embodiment and the second and third modifications described above, all lines included in the images 300, 400, 500, 600, 700, 800 are solid lines. However, at least one of those lines may be a dotted line or a dot-and-dash line.

So far, modifications of the embodiment in the present disclosure have been described. It is to be noted that the modifications described above may be combined in any way.

The function of each component of the display system 100 and the display control device 104 described above may be achieved by a computer program.

Figure 10:
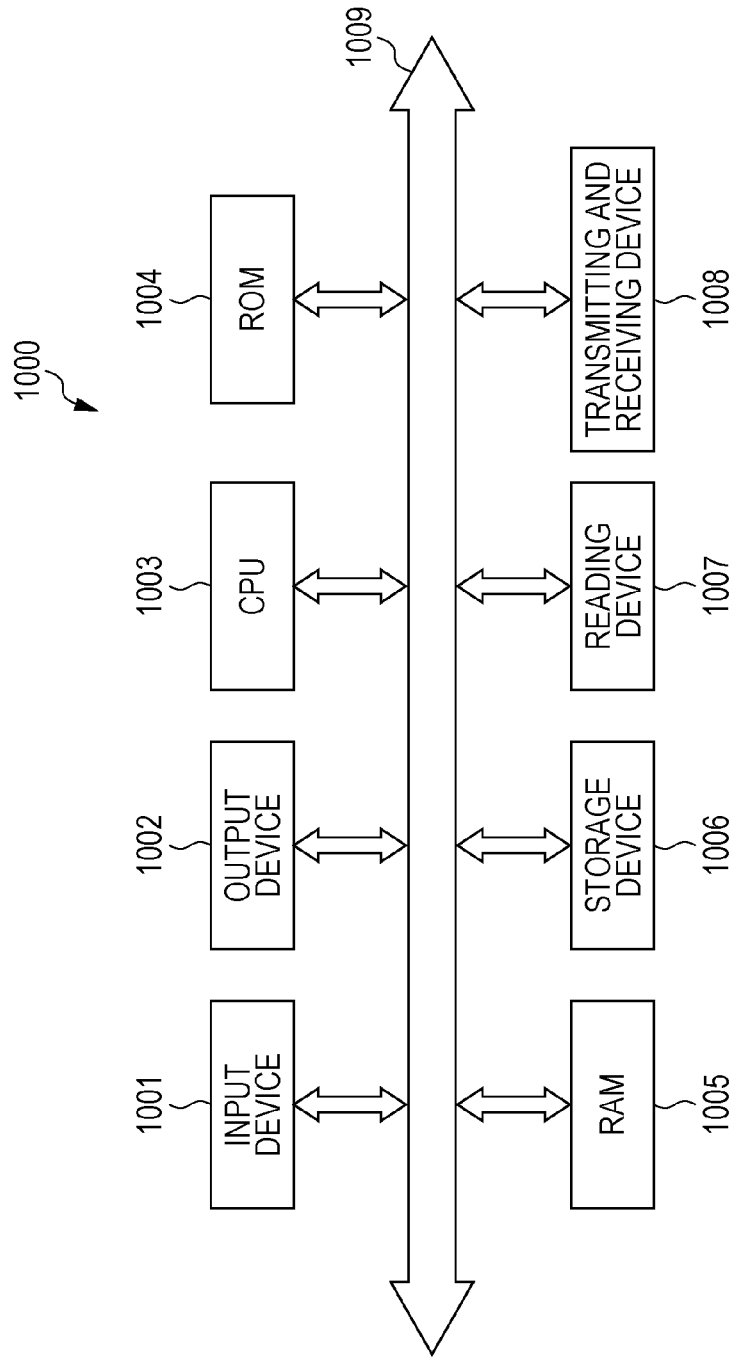
FIG. 10 is a block diagram illustrating a hardware configuration example of the display system and a display control device according to the embodiment of the present disclosure.

FIG. 10 is a diagram illustrating a hardware configuration that achieves the function of each component by a program. A computer 1000 includes an input device 1001 such as an input button or a touchpad, an output device 1002 such as a display or a speaker, a central processing unit (CPU) 1003, a read only memory (ROM) 1004, and a random access memory (RAM) 1005. In addition, the computer 1000 includes a storage device 1006 such as a hard disk drive or a solid state drive (SSD), a reading device 1007 that reads information from a recording medium such as a digital versatile disk read only memory (DVD-ROM) or a universal serial bus (USB) memory, and a transmitting and receiving device 1008 that performs communication via a network. Each of the above-mentioned components is connected to a bus 1009.

The reading device 1007 then reads a program from a recording medium on which the program is recorded for achieving the function of each component mentioned above and stores the program in the storage device 1006. Alternatively, the transmitting and receiving device 1008 communicates with a server system connected to the network and stores a program downloaded from the server system into the storage device 1006, the program for achieving the functions of each component mentioned above.

The CPU 1003 then copies the program recorded on the storage device 1006 to the RAM 1005, reads the commands included in the program successively from the RAM 1005 and executes the commands, thereby achieving the function of each component mentioned above. When the program is executed, information obtained by various types of processing, which has been described in the embodiment, is stored in the RAM 1005 or the storage device 1006 to be utilized as needed.

The present disclosure is useful for a display control device that controls display of information provided to a user (for instance, an occupant of a vehicle or a user wearing a display device), a display control method, a non-transitory recording medium, and a projection device.

What is claimed is:

1. A display control device comprising:
    an acquirer that receives information on an inclination of a head of an occupant in a mobile body from a detector that detects the inclination; and
    a controller that controls a displayer to generate a predetermined image based on a result of recognition of an object in front of the mobile body and the inclination information, the result obtained from a recognizer, the predetermined image representing a presentation image to be superimposed on the object as viewed from the occupant when the presentation image is displayed on a display medium,
    wherein, when the object is recognized, and
    when the head is not inclined, the controller outputs control information to the displayer to generate a first predetermined image that represents a first presentation image that includes one or more first lines in which a line segment connecting both ends is horizontal, and
    when the head is inclined, the controller outputs control information to the displayer to generate a second predetermined image that represents a second presentation image that includes a second line which is obtained by inclining only at least one of the one or more first lines by an angle which is determined according to the inclination of the head of the occupant, a virtual image of the second presentation image becomes visible to the occupant as double images on each of a left side and a right side of the object.

2. The display control device according to claim 1,
    wherein the first presentation image includes the one or more first lines and a line other than the one or more first lines, the second presentation image includes the second line and a line other than the second line, and
    the controller makes a brightness of the one or more first lines higher than a brightness of the line other than the one or more first lines, and makes a brightness of the second line higher than a brightness of the line other than the second line.

3. A display control method comprising:
    obtaining information on an inclination of a head of an occupant in a mobile body from a detector that detects the inclination; and
    controlling a displayer to generate a predetermined image based on a result of recognition of an object in front of the mobile body and the inclination information, the result obtained from a recognizer, the predetermined image representing a presentation image to be superimposed on the object as viewed from the occupant when the presentation image is displayed on a display medium, wherein, when the object is recognized, and when the head is not inclined, the controlling further comprises outputting control information to the displayer to generate a first predetermined image that represents a first presentation image that includes one or more first lines in which a line segment connecting both ends is horizontal, and when the head is inclined, the controlling further comprises outputting control information to the displayer to generate a second predetermined image that represents a second presentation image that includes a second line which is obtained by inclining only at least one of the one or more first lines by an angle which is determined according to the inclination of the head of the occupant, a virtual image of the second presentation image becoming visible to the occupant as double images on each side of a left side and a right side of the object.

4. The display control method according to claim 3, wherein the first presentation image includes the one or more first lines and a line other than the one or more first lines, the second presentation image includes the second line and a line other than the second line, and the controlling makes a brightness of the one or more first lines higher than a brightness of the line other than the one or more first lines, and makes a brightness of the second line higher than a brightness of the line other than the second line.

5. A non-transitory computer readable recording medium on which a program is recorded, the program causing a computer to execute:

obtaining information on an inclination of a head of an occupant in a mobile body from a detector that detects the inclination; and controlling a displayer to generate a predetermined image based on a result of recognition of an object in front of the mobile body and the inclination information, the result obtained from a recognizer, the predetermined image representing a presentation image to be superimposed on the object as viewed from the occupant when the presentation image is displayed on a display medium, wherein, when the object is recognized, and when the head is not inclined, the controlling further comprises outputting control information to the displayer to generate a first predetermined image that represents a first presentation image that includes one or more first lines in which a line segment connecting both ends is horizontal, and when the head is inclined, the controlling further comprises outputting control information to the displayer to generate a second predetermined image that represents a second presentation image that includes a second line which is obtained by inclining only at least one of the one or more first lines by an angle which is determined according to the inclination of the head of the occupant, a virtual image of the second presentation image becoming visible to the occupant as double images on each side of a left side and a right side of the object.

6. A non-transitory computer readable recording medium on which a program is recorded according to claim 5, wherein the first presentation image includes the one or more first lines and a line other than the one or more first lines, the second presentation image includes the second line and a line other than the second line, and the controlling makes a brightness of the one or more first lines higher than a brightness of the line other than the one or more first lines, and makes a brightness of the second line higher than a brightness of the line other than the second line.

7. A projection device comprising:

an acquirer that receives information on an inclination of a head of an occupant in a mobile body from a detector that detects the inclination;

a displayer that generates a predetermined image and displays the predetermined image on a display medium based on a result of recognition of an object in front of the mobile body and the inclination information, the result obtained from a recognizer; and a controller that controls the displayer to generate a predetermined image that represents a presentation image to be superimposed on the object as viewed from the occupant when the presentation image is displayed on the display medium, wherein, when the object is recognized, and when the head is not inclined, the controller outputs control information to the displayer to generate a first predetermined image that represents a first presentation image that includes one or more first lines in which a line segment connecting both ends is horizontal, and when the head is inclined, the controller outputs a control information to the displayer to generate a second predetermined image that represents a second presentation image that includes a second line which is obtained by inclining only at least one of the one or more first lines by an angle which is determined according to the inclination of the head of the occupant, a virtual image of the second presentation image becoming visible to the occupant as double images on each side of a left side and a right side of the object.

8. A projection device according to claim 7, wherein the first presentation image includes the one or more first lines and a line other than the one or more first lines, the second presentation image includes the second line and a line other than the second line, and the controller makes a brightness of the one or more first lines higher than a brightness of the line other than the one or more first lines, and makes a brightness of the second line higher than a brightness of the line other than the second line.

* * * * *